United States Patent

[11] 3,581,115

[72] Inventor Rolf Weber
Munich, Germany
[21] Appl. No. 834,946
[22] Filed June 20, 1969
[45] Patented May 25, 1971
[73] Assignee Siemens Aktiengesellschaft
Berlin, Germany
[32] Priority June 22, 1968
[33] Germany
[31] P 17 62 470.3

[54] PULSE GENERATOR FOR PROVIDING A PLURALITY OF PULSES IN DETERMINED PHASE POSITIONS
7 Claims, 4 Drawing Figs.

[52] U.S. Cl. .......... 307/262, 328/55, 328/72, 328/155
[51] Int. Cl. .......... H03k 1/12
[50] Field of Search .......... 328/55, 72, 73, 74, 155

[56] References Cited
UNITED STATES PATENTS
3,395,353 7/1968 King .......... 328/72
3,517,319 6/1970 Drogin .......... 328/155

*Primary Examiner*—John S. Heyman
*Attorneys*—Curt M. Avery, Arthur E. Wilfond, Herbert L. Lerner and Daniel J. Tick

ABSTRACT: A switch is switched to its conductive condition by the output of a bistable multivibrator and transfers pulses produced by a pulse generator to a counter. The counter counts the pulses and supplies an output signal indicating the end of a counting cycle to an AND gate connected in the reset input of the multivibrator. When an auxiliary signal is supplied to the AND gate, the output signal of the counter resets the multivibrator and the switch is switched to its nonconductive condition and prevents the supply of pulses from the pulse generator to the counter.

PULSE GENERATOR FOR PROVIDING A PLURALITY OF PULSES IN DETERMINED PHASE POSITIONS

Description of the Invention

The present invention relates to a pulse generator. More particularly, the invention relates to a pulse generator for providing a plurality of pulses in determined phase positions.

It is often necessary to produce a plurality of pulses within one cycle or period of an AC control voltage. Each of the pulses must have an exactly defined phase position with respect to the AC control voltage. This is the case, for example, with welding controllers or machine tools, for which it is essential that a step sequence of a stepping switch mechanism, which is controlled by a continuous counting cycle of a counter, proceeds without disturbance. Since the counter frequently comprises a binary counter wherein the transition from one counting step to the next is determined by the switching from one counter stage to one or more other stages, this may result in erroneous switching processes. That is, an incorrect operating step could be initiated if the switching periods of the counting stages and the switching periods of the stages of the stepping switch mechanism coincide.

It has therefore been suggested that the counting stages of such a stepping switch be controlled by time-staggered pulses, with exactly defined phase angles relative to an alternating voltage. The pulses must be in sequence, so that the switching is an exactly defined process.

To produce time-staggered pulses of the aforedescribed type, it was customary to use phase shifters, controlled by the AC control voltage. The output voltage of the phase shifters was supplied to a pulse shaper. The pulse shaper produced voltages of substantially rectangular shape having the same cycle or period as the AC control voltage. The required staggered control pulses were then derived from the rectangularly shaped voltages by differentiation.

Interfering pulses superimposed upon the alternating voltage may cause the pulse intervals to lose their adjusted phase angles. In adverse circumstances, this may even result in a loss of sequence of the pulses as to the time sequence. Another disadvantage of the known circuits is that the phase angles of the pulses must be determined by adjustment of the phase shifters. Another disadvantage of the known pulse generators is that they are practical only when conventional circuit components are used. The known pulse generators cannot be provided as integrated circuits, which are used with increasing frequency. Thus, for example, the capacitors of the differentiating circuits may be produced only at great expense as integrated circuit components, while, on the other hand, conventional capacitors partly obviate the space gained by utilization of integrated circuits.

The present invention relates to a pulse generator which is controlled by a single derived from an AC control voltage and which delivers, within a time interval determined by the cycle of the AC control voltage, pulses defined or determined in phase position with respect to said AC control voltage.

The principal object of the present invention is to provide a new and improved pulse generator.

An object of the present invention is to provide a pulse generator for providing a plurality of pulses in determined phase positions.

An object of the present invention is to provide a pulse generator of simple structure for providing a plurality of pulses in determined phase positions.

An object of the present invention is to provide a pulse generator for providing a plurality of pulses in determined phase positions, which pulse generator overcomes the disadvantages of known pulse generators of similar type.

An object of the present invention is to provide a pulse generator for providing a plurality of pulses in determined phase positions, in which the phase positions of the pulses are not disturbed by interfering pulses superimposed upon the AC control voltage.

An object of the present invention is to provide a pulse generator for providing a plurality of pulses in determined phase positions, wherein the phase positions of the pulses may be changed with facility.

An object of the present invention is to provide a pulse generator for providing a plurality of pulses in determined phase positions with efficiency, effectiveness and reliability.

In accordance with the present invention, a pulse generator controlled by a signal derived from an AC control voltage and providing a plurality of pulses of determined phase position relative to the AC control voltage within a time interval determined by the cycle of the AC control voltage, comprises a bistable multivibrator having a set input, a reset input and a set output. An AND gate has a pair of inputs and an output connected to the reset input of the bistable multivibrator. Input means connected to the set input of the bistable multivibrator and one of the inputs of the AND gate supplies to the set input a start signal derived from an AC control voltage and supplies to the AND gate an auxiliary signal derived from the AC control voltage. A pulse generator having an output produces a plurality of pulses. A switch having control means connected to the set output of the bistable multivibrator is selectively switched to conductive condition and nonconductive condition under the control of the bistable multivibrator. A counter has an output connected to the other of the inputs of the AND gate and an input connected to the output of the pulse generator via the switch in a manner whereby when the switch is switched to its conductive condition by the output of the bistable multivibrator, the pulse generator supplies pulses to the counter and the counter counts the pulses and supplies an output signal indicating the end of a counting cycle to the AND gate. When the auxiliary signal signal is supplied to the AND gate, the output signal of the counter resets the bistable multivibrator and the switch is switched to its nonconductive condition and prevents the supply of pulses from the pulse generator to the counter.

The input means comprises first and second pulse shapers, phase shifting means for shifting a voltage, a source of AC control voltage coupled to the first pulse shaper via the phase shifting means and coupled directly to the second pulse shaper and applying the AC control voltage thereto, a first monostable multivibrator connected between the first pulse shaper and the set input of the bistable multivibrator and a second monostable multivibrator connected between the second pulse shaper and the one input of the AND gate. The operating times of the monostable multivibrators are shorter than the counting cycle of the counter.

The counter comprises a binary counter having output means and an encoder connected to the output means of the counter for providing adjustable coding. The pulse generator, the bistable multivibrator, and the AND gate, the counter and the encoder comprise integrated circuits. The phase-shifting means comprises a phase shifter for shifting a voltage 180° in phase. A welding controller may include the pulse generator of the present invention.

In order that the present invention may be readily carried into effect, it will now be described with reference to the accompanying drawings, wherein.

Figures 1, 2, 3:
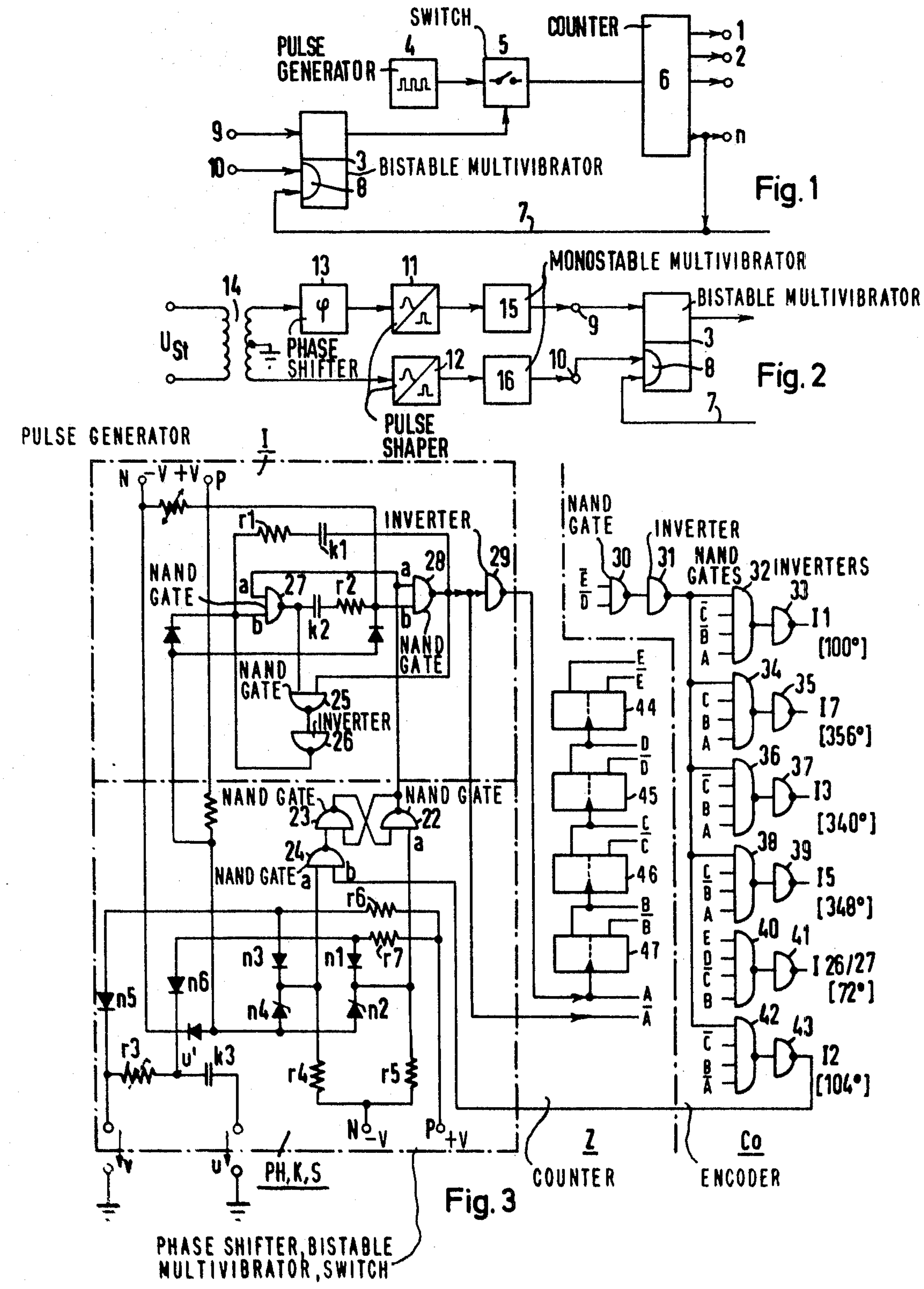
FIG. 1 is a block diagram of an embodiment of the pulse generator of the present invention.
FIG. 2 is a block diagram for an embodiment of a control signal producing circuit for the pulse generator of FIG. 1.
FIG. 3 is a circuit diagram of the embodiment of FIG. 1.

In FIG. 1, the pulse generator comprises a bistable multivibrator or flip-flop 3. The flip-flop 3 has a set input 9, to which a start signal is supplied. The flip-flop 3 has a set output connected to a switch or switching device 5. The switch 5 connects the output of a pulse generator 4 to the input of a counter 6. This counter 6 has outputs 1,2... *n*. The output of the counter 6 is connected via a lead 7 to an input of an AND gate 8.

The output of the AND gate 8 is connected to the reset input of the flip-flop 3. An auxiliary signal is supplied to the other input 10 of the AND gate 8. When the flip-flop 3 is set by a start signal supplied to its set input 9, an output voltage is provided at the set output of said flip-flop. The output voltage of the flip-flop 3 switches the switch 5 to its conductive condition and transfers the pulses produced by the pulse generator 4 to the input of the counter 6.

The counter 6 counts the pulses supplied by the pulse generator 4 via the switch 5, from its position 1 to its position $n$. When the counter has reached the end of a counting cycle, it produces an output signal at its output $n$. The output signal at the output $n$ of the counter 6 is supplied to an input of the AND gate 8 via the lead 7. If an auxiliary signal is supplied to the input 10 of the AND gate 8, said AND gate is switched to its conductive condition.

When the AND gate 8 is in its conductive condition, it resets the flip-flop 3. This eliminates the output signal in the set output of the flip-flop 3 and switches the switch 5 to its nonconductive condition, so that said switch prevents the supply of pulses from the pulse generator 4 to the counter 6. The counter 6 then ceases to count. When the next start signal is supplied to the set input 9 of the flip-flop 3, the new counting cycle commences, if there is no auxiliary signal supplied to the input 10 of the AND gate 8 at such time.

The switch 5 may be eliminated, and the pulse generator 4 may then be directly controlled in operation by the output voltage of the flip-flop 3. In such case, the pulse generator 4 would be switched to its nonconductive condition when there is no output voltage produced by the flip-flop 3 and would be switched to its operative condition by an output voltage of said flip-flop.

When the start signal and the auxiliary signal are provided in the first and second zero passages of a half-cycle of the AC control voltage, for example, the pulses provided at the output of the counter 6 are in exactly determined or defined phase positions relative to said half-cycle or half period. The phase positions of the pulses are determined by the frequency of the pulse generator 4.

If the frequency of the AC control voltage is assumed to be 50hertz, for example, an interval of 10milliseconds is provided between the start signal and the auxiliary signal. If the counting capacity of the counter 6 is, for example, 10, the pulse generator 4 would have to supply 10 pulses within 10milliseconds. This corresponds to a pulse repetition rate or frequency of 1kilohertz at a separation of 18 electrical degrees from the center of a pulse to the center of the next adjacent pulse. The pulses then have determined or defined phase positions of 0°, 18°, 36°, 54°,...,and so on.

If the pulses provided at the outputs of the counter 6 are displaced in phase, relative to the AC control voltage, by 0°, 4°, 8°, 12°,...,180°, said counter must be able to perform 180:4 =45 counting steps.

If the pulses are to be supplied within a period of 180° to 360° of the AC control voltage, it is merely necessary to connect the lead from the flip-flop 3 to the switch 5 to the reset output of said flip-flop. If the pulses must be provided within a range of phases rather than between 0° and 180° 180° 360° relative to the AC control voltage, a phase shifter must be utilized for the AC control voltage. The start signal and the auxiliary signal are then provided from the phase-shifted output voltage produced by the phase shifter.

If the phase displacement between the AC control voltage and the output voltage is 30 electrical degrees, for example, the pulses at the output of the counter 6 have phase positions, relative to the AC control voltage, 30 electrical degrees, 34 electrical degrees, 38 electrical degrees, 210 electrical degrees or 210 electrical degrees, 214 electrical degrees, 218 electrical degrees,...30 electrical degrees.

FIG. 2 illustrates a control signal producing circuit for the pulse generator of FIG. 1. The circuit of FIG. 2 produces the start signal and the auxiliary signal. FIG. 2 comprises a pair of pulse shapers 11 and 12. The output of the first pulse shaper 11 is connected to the set input 9 of the bistable multivibrator 3 via a first monostable multivibrator 15. The output of the second pulse shaper 12 is connected to the input 10 of the AND gate 8 via a second monostable multivibrator 16. One end of the secondary winding of a transformer 14 is connected to the input of the first pulse shaper 11 via a phase shifter 13. The other end of the secondary winding of the transformer 14 is connected to the input of the second pulse shaper 12. The AC control voltage $U_{ST}$ is applied to the primary winding of the transformer 14. The secondary winding of the transformer 14 has a center tap which is connected to ground.

The pulse shapers 11 and 12 produce an output voltage of rectangular shape having leading edges which substantially coincide with the zero passages of the AC control voltage. The rectangular voltages set the monostable multivibrators 15 and 16. The output voltage of the monostable multivibrator 15 is applied to the set input 9 of the flip-flop 3 and the output voltage of the monostable multivibrator 16 is applied to the input 10 of the AND gate 8. The operating periods of the monostable flip-flops 15 and 16 are selected so that there is never a signal produced simultaneously at both the set input 9 of the flip-flop 3 and the input 10 of the AND gate 8.

Since the alternating voltages supplied to the pulse shapers 11 and 12 have a phase difference of 180°, the flip-flop 3 is set during the first zero passage of the AC control voltage, and is reset during the second zero passage of said AC control voltage. The pulse generator is thus released within an interval of 180 electrical degrees.

If pulses must be provided in an interval which is either longer or shorter than that corresponding to a half-cycle or half period of the AC control voltage, said AC control voltage may be supplied to the pulse shaper 11 via the phase shifter 13. If the phase shifter 13 is adjusted to 60°, for example, the voltage applied to the set input 9 of the flip-flop 3 sets said flip-flop for 240 electrical degrees. On the other hand, when pulses must be provided at an interval of 4 electrical degrees, the counter 6 must be able to perform 240:4=60 counting steps. The frequency of the pulse generator 4 remains at 4.5 kilohertz. The pulse shaper 12 permits the adjustment of the resetting of the flip-flop 3. The monostable multivibrators 15 and 16 may be eliminated if the flip-flop 3 is directly controlled by pulses derived from the leading edges of the pulses produced by the p pulse shaper 11, for example.

FIG. 3 is a circuit arrangement of the pulse generator circuit of FIG. 1. The circuit of FIG. 3 comprises a phase shifter PH, a bistable multivibrator K, a pulse generator I and a binary counter Z. The binary counter Z includes an encoder Co connected to the outputs of said counter. The output pulses of the encoder Co have phase positions which are determined or defined relative to the AC control voltage.

The pulse generator I primarily comprises two NAND gates 27 and 28. The NAND gates 27 and 28 are coupled to each other via RC components $r1$ and $k1$ and RC components $r2$ and $k2$, connected as a type of astable multivibrator. The outputs of the NAND gates 27 and 28 are connected to corresponding inputs of a NAND gate 25. The output of the NAND gate 25 is connected to an input $b$ of the NAND gate 27 via an inverter 26, and is connected to the output of the NAND gate 28 via the RC components $r1$ and $k1$.

The flip-flop K, which provides the switching operations, substantially comprises two NAND gates 22 and 23. A NAND gate 24 has an output connected to one input of the NAND gate 23 and an input $a$ connected to a negative voltage terminal N of a DC voltage source via a resistor $r4$. The other input $b$ of the NAND gate 24 is connected to an output I2 of the encoder Co. The output of the NAND gate 22 is connected to the input $a$ of the NAND gate 27 and the input $a$ of the NAND gate 28.

A NAND gate is described on pages 101 and 102 of volume 6, entitled, "Solid-State Computer Circuits" of a series entitled, "Computer Basics," by Technical Education and Management, Inc., 1962, Howard W. Sams & Co., Inc., The Bobbs-Merrill Company, Inc., Indianapolis and New York.

The pulse generator I1 has two input terminals *u* and *v*. Two AC control voltages, displaced in phase by 180° relative to N, are applied to the input terminals *u* and *v*. A phase shifter comprises a resistor *r*3 and a capacitor *k*3 connected between the input terminals *u* and *v*. The input terminal *v* is connected to the positive voltage terminal P of the DC voltage source via a diode *n*5 and a resistor *r*6. The phase shifter has a top point *u*′, which is connected to the positive polarity terminal P of the DC voltage source via a diode *n*6 and a resistor *r*7.

Figure 4:
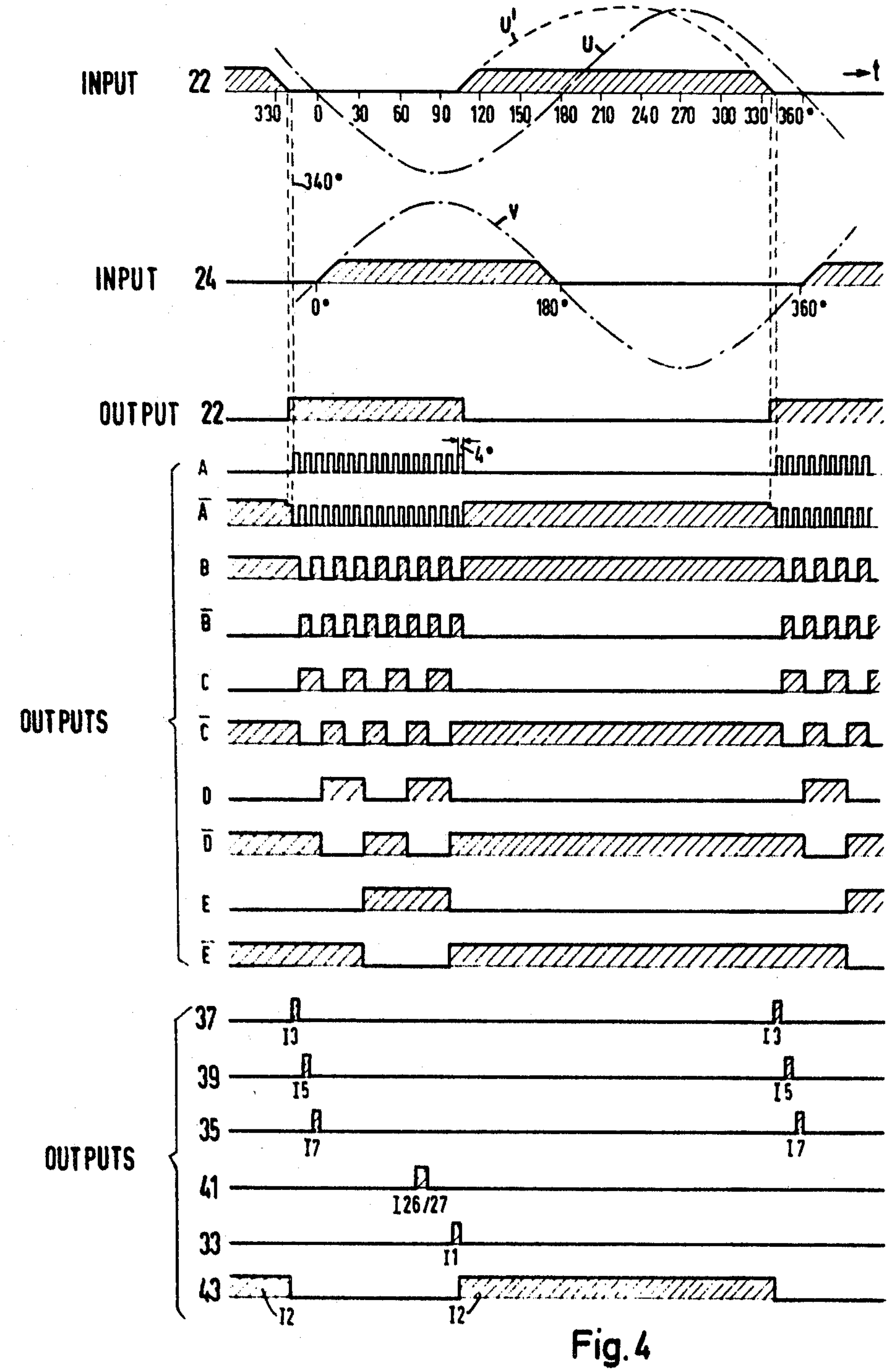
FIG. 4 is a plurality of graphical illustrations of waveforms appearing in the circuit arrangement of FIG. 3.

When the voltage at the input terminal *v* or the voltage at the tap point *u*′ of the phase shifter decreases to a magnitude less than that of the direct voltage at the anodes of diodes *n*3 and *n*1, said diodes are switched to their conductive condition and the appropriate alternating voltages are applied to the cathodes of said diodes. The alternating voltages are limited by two Zener diodes *n*4 and *n*2, so that the inputs *a* of the NAND gates 24 and 22 have supplied thereto substantially rectangular voltages having waveforms shown in the first and second curves 22 and 24 of FIG. 4 in section. The NAND gate 22 then produces an output signal, due to the coupling of the NAND gates 22, 23 and 24, when there is no longer a voltage applied to the input *a* of the NAND gate 22 and to the input *a* of the NAND gate 24, and a voltage indicating the end of the counting cycle of the counter Z is applied to the input *b* of the NAND gate 24. Consequently, an input voltage is applied to the input *a* of each of the NAND gates 27 and 28 of the pulse generator I. The pulse generator I thus commences to operate and produces pulses at the output of the NAND gate 28. The frequency of the pulses produced at the output of the NAND gate 28 is substantially determined by the time constant of the RC components.

The NAND gate 25 and the inverter 26 function to permit the commencement of operation of the pulse generator I at a determined phase position. The output voltage of the inverter 26 is always 26 is always 1 when there is no signal supplied to the input of said inverter, due to the pulse generator I being inoperative or at rest, so that a voltage is applied to the input *b* of the NAND gate 27. When an input signal is applied to the inverter 26, said inverter produces a 0 output. Thus, the inverter 26, produces no output voltages when the pulse generator I is in operation. A signal or voltage 1 is alternately applied to one of the inputs of the NAND gate 25 and a signal or voltage 0 is alternately applied to the other of the inputs of said NAND gate.

The input to the counter Z is connected to the output of the NAND gate 28 via an inverter 29. The pulses provided at the output of the inverter 29 are illustrated in curve A of FIG. 4. The inverted pulses provided in the lead $\overline{A}$ are illustrated in curve $\overline{A}$ of FIG. 4. The outputs of the counter Z are connected to the appropriate inputs of the encoder Co, as indicated by A, $\overline{A}$; B, $\overline{B}$; C, $\overline{C}$; D, $\overline{D}$ and E, $\overline{E}$. The encoder Co comprises a plurality of NAND gates 30, 32, 34, 36, 38, 40 and 42, and a plurality of inverters 31, 33, 35, 37, 39, 41 and 43.

The operation of the binary counter Z and the coding of the output signals of said counter by the operation of the encoder Co are known and are therefore not described herein. The binary counter Z comprises a plurality of bistable multivibrators or flip-flops 44, 45, 46 and 47. The output signals of the flip-flops 44, 45, 46, and 47 of the counter Z are illustrated in curves A, $\overline{A}$, B, $\overline{B}$, C, $\overline{C}$, D, $\overline{D}$, E, and $\overline{E}$ of FIG. 4.

In order to maintain a simple coding operation, the end of the counting cycle and the rest position of the counter are determined by counting position 2. The first actual counting pulse is then indicated by the counting position 3. The counting position 3 is provided at the output of the inverter 37.

A welding controller requires pulses which are preferably provided during an interval occuring at the end of a first half cyclic or half period and at the beginning of a second half cycle or half period of the AC control voltage. If, for example, pulses are to be provided at phase positions, relative to the AC control voltage, of 340°, 348°, 356° 72°, 100° and 140°, and if the duration of such pulses is to be 4 electrical degrees, the phase angle of the rectangular voltage derived from the AC control voltage is adjusted relative to the AC control voltage in a manner whereby the rectangular voltage becomes zero at the time that the first counting pulse must be provided.

In the aforedescribed example, the first counting pulse is the pulse having a phase angle of 340°. As stipulated, this may only be the pulse which corresponds to the counting position 3, since the counting position 2 indicates the end of the counting cycle and the commencement of the next succeeding counting cycle. The first counting pulse is provided at the first counting position 3 at the output of the inverter 37. The next counting pulse is provided at the counting position 5 at the output of the inverter 39 at the phase position of 348°. The counting pulse provided at the phase position of 356° is provided at the counting position 7 at the output of the inverter 35. In order to simplify the coding operation, the counting pulse provided at the phase positions of 72° is a pulse of double duration and is indicated as the counting position 26/27 at the output of the inverter 41.

When the counting cycle of the counter Z is completed, said counter performs an additional counting step and then remains in the counting position 2, since this provides a voltage which is applied to the input *b* and the input *a* of the NAND gate 24. The counter Z may commence or start the next counting cycle when the voltage at the input *a* of the NAND gate 24 is again removed and the voltage at the input *a* of the NAND gate 22 becomes zero. The output voltages of the inverters 37, 39, 35, 41, 33 and 43 of the encoder Co are illustrated in the curves of the same numbers of FIG. 4.

If, as indicated in the aforedescribed example, pulses in other phase positions are required, it is only necessary to change the coding. That is, it is necessary only to change the correlation of the outputs of the counter to the inputs of the encoder. This permits the provision of pulses with arbitrary, but defined or determined, phase positions, and without mutual superposition relative to the AC controlling voltage. The pulse generator of the present invention is insensitive to interfering pulses produced by the power network, although said interfering pulses may slightly shift the counting cycle toward the AC control voltage. Neither the mutual phase positions nor the sequence of the pulses is influenced by the interfering pulses.

While the invention has been described by means of a specific example and in a specific embodiment, I do not wish to be limited thereto, for obvious modifications will occur to those skilled in the art without departing from the spirit and scope of the invention.

I claim:

1. A pulse generator controlled by a signal derived from an AC control voltage and providing a plurality of pulses of determined phase position relative to said AC control voltage within a time interval determined by the cycle of the AC control voltage, said pulse generator comprising a bistable multivibrator having a set input, a reset input and a set output;

an AND gate having a pair of inputs and an output connected to the reset input c of said bistable multivibrator;

input means connected to the set input of said bistable multivibrator and one of the inputs of said AND gate for supplying to said set input a start signal derived from an AC control voltage and for supplying to said AND gate an auxiliary signal derived from said AC control voltage;

a pulse generator having an output for producing a plurality of pulses;

a switch having control means connected to the set output of said bistable multivibrator and selectively switched to conductive condition and nonconductive condition under the control of said bistable multivibrator; and a counter having an output connected to the other of the inputs of said AND gate and an input connected to the output of said pulse generator via said switch in a manner whereby when said switch is switched to its conductive condition by the output of said bistable multivibrator said pulse generator supplies pulses to said counter and said counter counts said pulses and supplies an output signal indicating the end of a counting cycle to said AND gate and when said auxiliary signal is supplied to said AND gate the output signal of said counter resets said bistable multivibrator and said switch is switched to its nonconductive condition and prevents the supply of pulses from said pulse generator to said counter.

2. A phase-shifting generator as claimed in claim 1, wherein said input means comprises first and second pulse shapers, phase-shifting means for shifting a voltage, a source of AC control voltage coupled to said first pulse shaper via said phase means and coupled directly to said pulse shaper and applying said AC control voltage thereto, a first monostable multivibrator connected between said first pulse shaper and the set input of said bistable multivibrator and a second monostable multivibrator connected between said second pulse shaper and the one input of said AND gate, the operating times of said monostable multivibrators being shorter than the counting cycle of said counter.

3. A pulse generator as claimed in claim 1, wherein said counter comprises a binary counter having output means and an encoder connected to the output means of said counter for providing adjustable coding.

4. A pulse generator as claimed in claim 1, wherein said pulse generator, said bistable multivibrator, said AND gate and said counter comprise integrated circuits.

5. A pulse generator as claimed in claim 2, wherein said phase-shifting means comprises a phase shifter for shifting a voltage 180° in phase.

6. A pulse generator as claimed in claim 3, wherein said pulse generator, said bistable multivibrator, said AND gate, said counter and said encoder comprise integrated circuits.

7. In a welding controller, a pulse generator controlled by a signal derived from an AC control voltage and providing a plurality of pulses of determined phase position relative to said AC control voltage within a time interval determined by the cycle of the AC control voltage, said pulse generator comprising a bistable multivibrator having a set input, a reset input and a set output;

an AND gate having a pair of inputs and an output connected to the reset input of said bistable multivibrator;

input means connected to the set input of said bistable multivibrator and one of the inputs of said AND gate for supplying to said set input a start signal derived from an AC control voltage and for supplying to said AND gate an auxiliary signal derived from said AC control voltage;

a pulse generator having an output for producing a plurality of pulses;

a switch having control means connected to the set output of said bistable multivibrator and selectively switched to conductive condition and nonconductive condition under the control of said bistable multivibrator; and a counter having an output connected to the other of the inputs of said AND gate and an input connected to the output of said pulse generator via said switch in a manner whereby when said switch is switched to its conductive condition by the output of said bistable multivibrator said pulse generator supplies pulses to said counter and said counter counts said pulses and supplies an output signal indicating the end of a counting cycle to said AND gate and when said auxiliary signal is supplied to said AND gate the output signal of said counter resets said bistable multivibrator and said switch is switched to its nonconductive condition and prevents the supply of pulses from said pulse generator to said counter.